FIG. 1

REACTION STEP I

Chemical reaction scheme showing bisphenol A diglycidyl ether + 2 methacrylic acid, heat/catalyst, yielding the corresponding diol dimethacrylate.

REACTION STEP II

Chemical reaction scheme showing the diol dimethacrylate + 2 methacryloyl chloride, heat/catalyst, yielding the tetramethacrylate ester + 2 HCl.

FIG. 2

Structure of the final tetravinyl compound.

SANTOKH S. LABANA
ELIHU J. ARONOFF
INVENTORS

BY John R. Faulkner,
Olin B. Johnson
ATTORNEYS

United States Patent Office 3,591,626
Patented July 6, 1971

---

3,591,626
TETRAVINYL COMPOUNDS
Elihu J. Aronoff, Framingham, and Santokh S. Labana, Dearborn Heights, Mass., assignors to Ford Motor Company, Dearborn, Mich.
Filed Aug. 4, 1969, Ser. No. 847,241
Int. Cl. C07c 69/54
U.S. Cl. 260—486R
6 Claims

ABSTRACT OF THE DISCLOSURE

A tetravinyl compound having utility in coating compositions and other polymer-forming operations is formed by first reacting a diepoxide with acrylic and/or methacrylic acid and subsequently reacting the resultant ester condensation product with a vinyl unsaturated acyl halide.

---

This invention is concerned with novel tetravinyl compounds and to their preparation. These materials are formed by first reacting one mollar part of a diepoxide with two molar parts of acrylic and/or methacrylic acid to provide a divinyl compound having two free hydroxyl groups resulting from opening the epoxide rings and subsequently reacting the resultant ester condensation product with two molar parts of a vinyl unsaturated acyl halide. The first reaction step is illustrated by the representative reaction shown in FIG. 1 of the accompanying drawing. The second reaction step is illustrated by the representative reaction shown in FIG. 2.

The diepoxides employed as starting materials for preparing the tetravinyl compounds of this invention may be of the epichlorohydrin-bisphenol type, the epichlorohydrinpolyalcohol type, or those prepared by reacting diolefins with peracids, e.g. peracetic acid, or other means. Diepoxides and their preparation are discussed in detail in Modern Surface Coatings, Paul Nylen and Edward Sunderland, 1965 Science Publishers, a division of John Wiley & Sons Ltd., London-New York-Sydney, Library of Congress Catalog Card Number 65–28344, pp. 197–208. Representative diepoxides include, but not by way of limitation, the following:

(1) 3,4 - epoxy - 6 - methyl-cyclohexylmethyl-3,4-epoxymethyl-cyclohexanecarboxylate.
(2) 1-epoxyethyl-3,4-epoxylcyclohexane.
(3) dipentene dioxide (limonene dioxide).
(4) dicyclopentadienedioxide.
(5) dioxides having a structural formula in accordance with the following:

(a) 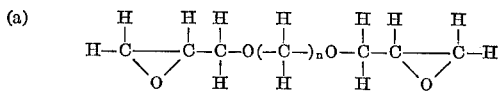

(b) 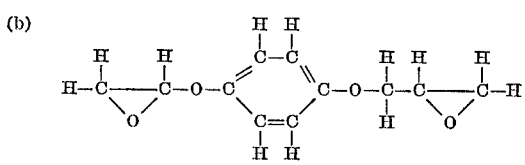

(c) 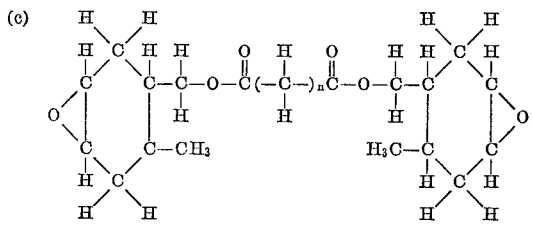

Other suitable diepoxides are disclosed in U.S. Patents 2,890,202; 3,256,226; 3,317,465; 3,373,221 and elsewhere in the literature. The diepoxides will usually have molecular weights below about 2,000, preferably in the range of about 140 to about 500. Usually, they consist essentially of carbon, hydrogen and oxygen. They may be saturated or unsaturated, aliphatic, cycloaliphatic, aromatic or heterocyclic and may be substituted, if desired, with non-interfering substituents such as halogen atoms, ether radicals, and the like. They may also be monomeric or polymeric.

The vinyl unsaturated acyl halides are preferably acryloyl chloride and/or methacryloyl chloride but others may be used, e.g., the corresponding bromides.

The resultant tetravinyl compounds of this invention are homopolymerizable and copolymerizable with vinyl monomers, e.g., styrene, vinyl toluene, alpha-methyl styrene, divinyl benzene, methyl methacrylate, ethyl-acrylate, butyl acrylate, butyl methacrylate, hydroxypropyl methacrylate, glycidyl methacrylate, etc., the divinyl reaction product formed by reacting a monepoxide with acrylic acid or methacrylic acid and then reacting the resultant ester condensation product with a vinyl unsaturated acyl halide, the divinyl reaction product formed by reacting a diepoxide with two molar parts of acrylic acid or methacrylic acid and subsequently reacting the resultant ester condensation product with two molar parts of a saturated acyl halide, alpha-beta olefinically unsaturated polymers, etc. The term "vinyl" as used herein refers to a compound having one or more terminal endings expressed by the radical

wherein X is H or $CH_3$.

The tetravinyl compounds of this invention find utility in thermosetting resins for various applications and have particular utility in radiation polymerizable paints which are crosslinked by exposure to an electron beam. In such use they comprise the sole polymerizable component of the film-forming binder of the coating material where their viscosity permits application by conventional paint application techniques or after dilution with nonpolymerizable solvent which can be flashed off after application. They are preferably employed in this use with one or more of the aforementioned materials with which they are copolymerizable.

The tetravinyl adducts of this invention have lower viscosities than their corresponding divinyl compounds produced in the first reaction step of the instant method. In relation to such divinyl compounds they are also more sensitive to ionizing radiation and have increased solubility in organic solvents such as toluene, dioxane, xylene, and in vinyl monomers.

3

This invention will be more fully understood from the following illustrative examples:

EXAMPLE 1

A tetravinyl compound is prepared in the following manner:

(1) To a reaction vessel qeuipped with condenser, stirrer, nitrogen inlet and thermometer are charged the following materials:

| | Parts by weight |
|---|---|
| Diepoxide:[1] | 192 |
| Methacrylic acid | 96 |
| Toluene (solvent) | 500 |
| Dimethyl benzylamine (catalyst) | 1 |

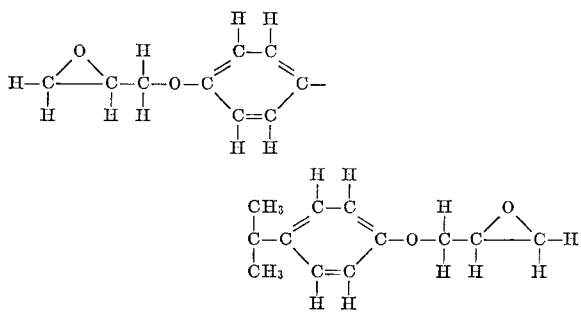

(2) The diepoxide, the methacrylic acid and the dimethyl benzylamine are intimately mixed and incrementally added to the toluene which is at 90° C. in a nitrogen atmosphere.

(3) The reaction mixture is maintained at 90° C. until reaction of the epoxide groups is essentially complete as measured by a product acid number of less than about 10.

(4) The solvent is removed under vacuum and a solid reaction product (softening point 45° C.) is recovered.

(5) The solid reaction product of (4) in the amount of 280 parts by weight is dissolved in 500 parts by weight of toluene and 110 parts by weight of methacryloyl chloride are added dropwise with the reaction mixture maintained at 65° C. until HCl evolution ceases.

(6) The solvent is removed under vacuum and a tetravinyl compound is recovered in the form of a viscous liquid.

EXAMPLE 2

A film-forming solution is formed from 75 parts by weight of the tetravinyl compound prepared in Example 1 and 25 parts by weight toluene and applied to a metal substrate. After allowing time for solvent flash-off, the film is cured by exposing the film to an electron beam until tack-free. The conditions of irradiation are:
Beam potential: 275 kv.
Current: 25 milliamperes
Atmosphere: nitrogen

EXAMPLE 3

The procedure of Example 1 is repeated with the sole difference that acryloyl chloride is substituted for the methacryloyl chloride.

EXAMPLE 4

A film-forming solution is formed from 9 parts by weight of the tetravinyl compound prepared in Example 3 and 1 part by weight of methyl methacrylate. The film-forming solution is applied as a film upon a metal substrate and on a polymeric substrate, i.e. polypropylene and acrylonitrile-butadiene-styrene copolymer. The film is cured with an electron beam as in Example 2.

This procedure is repeated using in separate operations styrene, ethyl acrylate, butyl acrylate and butyl methacrylate in lieu of the methyl methacrylate.

EXAMPLE 5

The procedure of Example 1 is repeated with the sole difference that acrylic acid is substituted for the methacrylic acid.

EXAMPLE 6

The procedure of Example 1 is repeated except that acryloyl chloride is substituted for the methacryloyl chloride and acrylic acid is substituted for the methacrylic acid.

EXAMPLE 7

A film-forming solution is formed from the following components:

| | Parts by wt. |
|---|---|
| Tetravinyl compound of Example 6 | 64 |
| Unsaturated polyester [1] | 32 |
| Tetrahydrofurfuryl oleate (plasticizer) | 4 |
| Butyl methacrylate | 12 |

[1] Polyester prepared by mixing in xylene (solvent) 20 molar parts maleic anhydride, 30 molar parts tetrahydrophthalic anhydride, and 50 molar parts neopentyl glycol and heating the reaction mix with catalyst (dibutyl tin oxide) for about 1.5 hours at about 171° C. and then raised to about 226° C. and maintained until the acid number is below about 20. The solvent is removed under vacuum and when the acid number is below about 10, there is added a small amount of hydroquinone.

The film-forming solution is applied as a paint film upon steel and wood substrates and irradiated with an electron beam as in the preceding examples.

EXAMPLE 8

A film-forming solution is formed from the following components:

| | Parts by wt. |
|---|---|
| Tetravinyl compound of Example 6 | 10 |
| Unsaturated copolymer of vinyl monomers [1] | 60 |
| Methyl methacrylate | 30 |

[1] Copolymer formed in the following manner:

| Starting materials: | Parts by wt. |
|---|---|
| Xylene | 600.00 |
| Methyl methacrylate | 196.00 |
| Ethyl acrylate | 333.00 |
| Glycidyl methacrylate | 71.00 |
| Azobisiso butyronitrile | 6.00 |
| Hydroquinone | 0.12 |
| Methacrylic acid | 42.00 |
| Triethyl amine | 0.96 |

Procedure

The reaction solvent, xylene, is charged to a flask fitted with a stirring rod, an addition funnel, a thermometer, a nitrogen inlet tube and a condenser. The amount of xylene is equal to the total weight of vinyl monomers to be added. The xylene is heated to reflux, nitrogen is bubbled through the solution during heat up and throughout the reaction. The combined monomers, excepting the methacrylic acid, and initiator (Azobisiso butyronitrile) is added to the refluxing solution evenly over a two-hour period. The initiator weight is 10 parts by weight per 1,000 parts by weight of vinyl monomers. The reaction solution is refluxed until the conversion of monomer to polymer is greater than 97 percent (8-16 hours).

In the second step, hydroquinone is added as an inhibitor and then methacrylic acid is added to react with the residual epoxy groups on the polymer. Triethylamine is used as a catalyst. This esterification reaction is carried out at reflux temperatures until 80 percent esterification is accomplished (determined by residual acid number). The xylene is then removed by vacuum distillation and the polymer dissolved in methyl methacrylate so that the weight ratio of polymer to solvent is two.

The film-forming solution is applied as a paint film upon substrates of steel, wood and polymeric solid, i.e. polypropylene and ABS (acrylonitrile-butadiene-styrene copolymer), and irradiated to tack-free state with an electron beam as in the preceding examples.

EXAMPLE 9

The procedure of Example 1 is repeated except that the diepoxide employed is 3,4-epoxy-6-methyl-cyclohexyl-methyl-3,4-epoxymethyl-cyclohexanecarboxylate.

EXAMPLE 10

The procedure of Example 3 is repeated except that the diepoxide employed is 1 - epoxyethyl - 3,4 - epoxycyclohexane.

EXAMPLE 11

The procedure of Example 6 is repeated except that the diepoxide employed is dipentene dioxide.

EXAMPLE 12

The procedure of Example 1 is repeated except that the diepoxide employed is dicyclopentadienedioxide.

EXAMPLE 13

The procedure of Example 3 is repeated except that the diepoxide employed has structural formula in accordance with the formula hereinbefore set forth and identified as diepoxide (5)(a) wherein $n$ is 4.

EXAMPLE 14

The procedure of Example 6 is repeated except that the diepoxide employed has structural formula in accordance with the formula hereinbefore set forth and identified as diepoxide (5)(b).

EXAMPLE 15

The procedure of Example 1 is repeated except that the diepoxide employed has structural formula in accordance with the formula hereinbefore set forth and identified as diepoxide (5)(c) wherein $n$ is 4.

EXAMPLE 16

The procedure of Example 1 is repeated with the sole difference that methacrylol bromide is used in lieu of methacryloyl chloride.

EXAMPLE 17

The proceure of Example 3 is repeated with the sole difference that acryloyl bromide is substituted for the acryloyl chloride.

It will be understood by those skilled in the art that modifications can be made within the foregoing examples without departing from the spirit and scope of the invention as set forth in the following claims.

We claim:

1. A tetravinyl compound formed by first reacting one molar part of a diepoxide with two molar parts of an alpha-beta olefinically unsaturated monocarboxylic acid selected from acrylic acid and methacrylic acid and subsequently reacting the resultant divinyl ester condensation product with two molar parts of vinyl unsaturated acyl halide.

2. A tetravinyl compound in accordance with claim 1 wherein said diepoxide has a molecular weight below about 2,000.

3. A tetravinyl compound in accordane with claim 1 wherein said acyl halide is the chloride of acrylic or methacrylic acid.

4. A tetravinyl compound in accordance with claim 1 wherein said acyl halide is the bromide of acrylic or methacrylic acid.

5. A tetravinyl compound in accordance with claim 1 wherein said diepoxide as a molecular weight in the range of about 140 to about 500.

6. A tetravinyl compound in accordance with claim 1 wherein said diepoxide has a molecular weight in the range of about 140 to about 350.

References Cited
UNITED STATES PATENTS

| | | | |
|---|---|---|---|
| 2,819,296 | 1/1958 | Carnes et al. | 260—486 |
| 2,895,947 | 7/1959 | Shokal et al. | 260—486X |
| 3,345,401 | 10/1967 | May et al. | 260—480 |

LEWIS GOTTS, Primary Examiner

P. J. KILLOS, Assistant Examiner

U.S. Cl. X.R.

106—287R; 117—132, 148; 260—78.4EP, 78.5BB, 348A